United States Patent [19]

Nakauchi

[11] 4,420,252

[45] Dec. 13, 1983

[54] LIGHT MEASURING DEVICE FOR CONTROLLING EXPOSURE

[75] Inventor: Kenji Nakauchi, Minami-ashigara, Japan

[73] Assignee: Fuji Photo Film Co., Ltd., Kanagawa, Japan

[21] Appl. No.: 218,561

[22] Filed: Dec. 22, 1980

[30] Foreign Application Priority Data

Dec. 21, 1979 [JP]  Japan ................................ 54-166690
Dec. 21, 1979 [JP]  Japan ................................ 54-166691

[51] Int. Cl.³ .............................................. G01J 1/30
[52] U.S. Cl. .................................... 356/225; 354/430; 354/432
[58] Field of Search ............... 356/222, 213, 216, 217, 356/218, 221, 225, 226; 354/31, 59, 42, 32, 25, 31 F; 250/578

[56] References Cited

U.S. PATENT DOCUMENTS

| 3,555,285 | 1/1971 | Irving | 250/578 X |
| 3,896,458 | 7/1975 | Johnson et al. | 354/59 |
| 3,906,219 | 9/1975 | Stauffer | 354/25 |
| 4,047,187 | 9/1977 | Mashimo et al. | 354/31 |
| 4,075,640 | 2/1978 | Ueda et al. | 354/31 |
| 4,104,654 | 8/1978 | Maitani et al. | 354/51 X |
| 4,182,573 | 1/1980 | Yamada et al. | 354/31 |

FOREIGN PATENT DOCUMENTS

| 46-8516 | 3/1971 | Japan . |
| 49-90926 | 8/1974 | Japan . |
| 49-90927 | 9/1974 | Japan . |
| 51-9271 | 3/1976 | Japan . |
| 51-75442 | 6/1976 | Japan . |
| 51-92622 | 8/1976 | Japan . |
| 53-13412 | 2/1978 | Japan . |
| 53-71834 | 6/1978 | Japan . |
| 53-96829 | 8/1978 | Japan . |
| 53-118127 | 10/1978 | Japan . |
| 54-91224 | 7/1979 | Japan . |

*Primary Examiner*—Bruce Y. Arnold
*Attorney, Agent, or Firm*—Pasquale A. Razzano

[57] ABSTRACT

A plurality of photodetectors are arranged to receive light from different parts of a photographic subject matter. The outputs of the photodetectors are weighted according to the position of the photodetectors. The weighted outputs are summed up and used as image brightness information. The weighting can be made by varying the size of the photodetectors or changing a covering area of a mask provided to cover the photodetectors.

11 Claims, 8 Drawing Figures

LIGHT MEASURING DEVICE FOR CONTROLLING EXPOSURE

BACKGROUND OF THE INVENTION

1. Field of the Invention

This invention relates to a light measuring device for use in a photographic camera or a printer, is more particularly directed to a light measuring device capable of providing weighted brightness information in which the image area is divided into a plurality of sections that are differently weighted.

2. Description of the Prior Art

There have been known various kinds of light measuring system such as averaged light measuring, center-weighted measuring and partial measuring. In the averaged light measuring, the averaged value of the amount of light from the entire scene viewed by the taking lens of the camera is measured through use of a photodetector which has substantially the same angle of view as that of the taking lens. In this light measuring system, it is impossible to obtain a proper exposure of the photographic subject matter if there is a bright background behind the subject matter such as the sky or a back light. Though it is known to correct the exposure controlled by the averaged light measuring by use of a correction means which effects increase or decrease of the measured values, it is troublesome to operate such a correcting means and it is difficult to accurately correct the exposure to the optimum amount.

In the center-weighted measuring, the central part of an image is weighted in comparison with the marginal part. In the partial measuring, only a part of an image is measured. These two light measuring systems are based on an empirical rule that the subject matter of photography is normally located around the center of the scene aimed by a camera and weights the central part in comparison with the marginal part to reduce the weighting of the brightness information of the marginal part of a scene. Accordingly, these two light measuring systems are disadvantageous in that the exposure cannot be properly controlled based thereon if the subject mater is not located at or near the center of a scene if the difference in brightness between the central pat and the marginal part is too large.

Beside the above mentioned light measuring systems, there have been known in the art to use the maximum and minimum values of the brightness of some parts of a scene to obtain more practical information as disclosed in Japanese Unexamined Patent Publication Nos. 92622/1976, 13412/1978, 91224/1979 and Japanese Utility Model Publication No. 9271/1976, and to divide the scene into the upper half and the lower half to obtain information of these halves separately as disclosed in Japanese Unexamined Patent Publication Nos. 75442/1976, 96829/1978, 90926/1974, 90927/1974, 71834/1978, 118127/1978 and Japanese Patent Publication No. 8516/1971.

The above-mentioned various kinds of light measuring systems, however, are all disadvantageous in that it is very difficult to provide the optimum light measuring or the optimum image information for any kind of scene. In other words, the above systems are effective for a few particular kinds of scene but not for all kinds of scene, because the photodetectors and the measured value operating circuit are always the same for any kind of scene.

SUMMARY OF THE INVENTION

The primary object of the present invention is to provide a light measuring device for use in a photographic camera or a printer which is able to provide weighted brightness information of a scene or image weighted in a desired weighting pattern.

A more specific object of the present invention is to provide a light measuring device capable of easily providing weighted brightness information weighted in a desired complex pattern.

Another object of the present invention is to provide a light measuring device which is able to provide brightness information of subject matter to be photographed or printed even if the subject matter has a complicated brightness distribution.

The above objects of the present invention are accomplished by measuring the brightness of a subject matter by use of a number of differently weighted photoconductors distributed over the whole area of an image focusing plane in a camera or printer.

The weighting of the photoconductors is made either by optically or electrically. In the optically weighting method, means for optically controlling the transmittance of light can be provided in front of a plurality of photodetectors having the same light receiving area, or the respective light receiving areas can be moved according to the position of the photodetectors. The photodetectors can be weighted differently by making different the amount of light energy per unit time that is incident on the various photodetectors, i.e. by making the incident luminous flux different for a subject of uniform brightness. The light receiving area of the photodetectors can be changed by changing the size of the light receiving face of the photodetector itself or by covering the photodetectors with a mask and changing the light shielding area of the mask for the respective photodetectors. The mask may be provided separately from the electrode of the photodetectors or may be made together with and integrally with the electrode. In the electrically weighting method, resistors having different resistance values are connected in series with the photodetectors to weight the outputs of the photodetectors and the series circuits of the photodetectorrs and the resistors are connected in parallel with each other. The parallel circuit of the photodetectors and the resistors are coupled to an operational amplifier to provide a brightness signal.

DESCRIPTION OF THE PREFERRED EMBODIMENTS

Now the present invention will be described in detail referring to the accompanying drawings.

Figure 1:
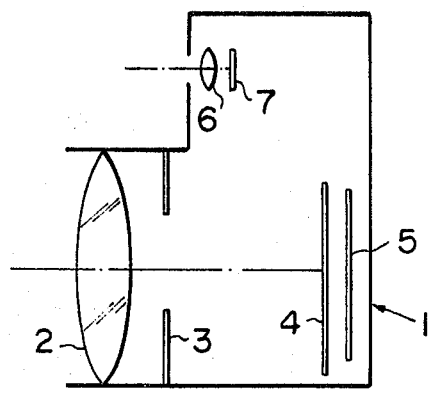
FIG. 1 is a schematic side sectional view showing a camera to be provided with the light measuring device of the present invention.

Referring to FIG. 1 showing an example of a camera to be provided with the light measuring device of the present invention, a camera body 1 is provided with a taking lens 2 in front face thereof, an aperture 3 just behind the taking lens 2, a shutter curtain immediately in front of film 5 located therebehind, and a light measuring device 6,7 located above the taking lens 2. The light measuring device is chiefly composed of an objective 6 having its optical axis parallel to that of the taking lens 2, and a light receiving portion 7 located on the focusing plane of the objective 6. The light receiving portion 7 is connected with an operating circuit for operating the output of the light receiving portion 7.

Figure 2:
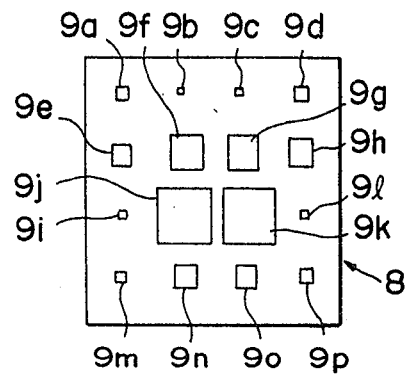
FIG. 2 is a front plan view showing the light receiving face of a light measuring device in accordance with an embodiment of the present invention.

FIG. 2 shows in detail an example of the front face of the light receiving portion 7 of the light measuring device of this invention. In this example, there are employed a number of photodetectors which are weighted by the size of the light receiving face thereof. In other words, the photodetectors 9a-9p have different size according to the position thereof. In the illustrated example, the lower central ones 9j and 9k have the largest size and the upper central ones 9f and 9g have the next largest size. The size of the photodetectors is determined to give more weight for the outputs those photodetectors located at the position where the probability of existence of the subject matter is higher according to empirical rules. The number of the photodetectors 9a-9p in the example shown in FIG. 1, may be more or less than the illustrated example. The size of the photoconductors located in the marginal portion of the image is preferably made smaller than that of those located in the central portion. It will sometimes be necessary to make the size of the marginally located photoconductors a little larger than the size theoretically determined by the low probability of existence of the subject matter, since the amount of light impinging upon the marginal portion of the light receiving area is sometimes smaller than that impinging upon the central portion thereof according to the lens system of the objective 6.

Figure 3:
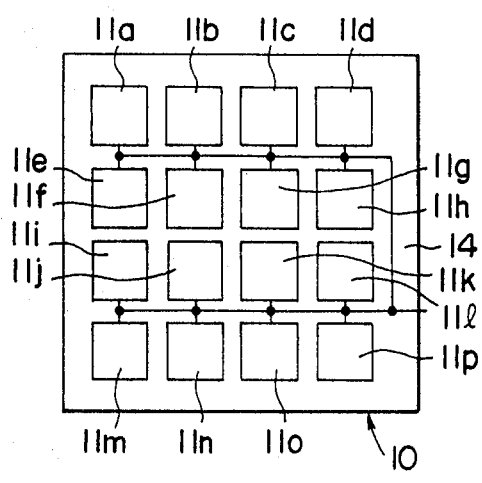
FIG. 3 is a front plan view showing the light receiving face of a light measuring device in accordance with another embodiment of the present invention.
Figure 4:
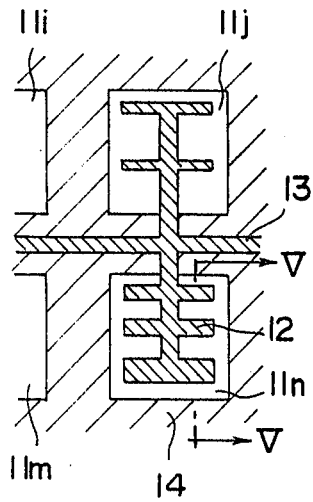
FIG. 4 is an enlarged fragmentary front view showing a part of the light receiving face of the light measuring device as shown in FIG. 3.
Figure 5:
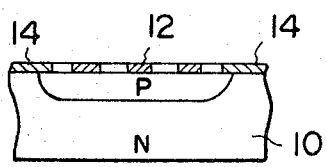
FIG. 5 is a fragmentary sectional view showing the section taken along line V—V in FIG. 4.

FIG. 3 shows another example of the front face of the light receiving portion 7 of the light measuring device of this invention. In this example, there are employed a number of photodetectors which are in the form of photodiodes made on a monolithic integrated circuit chip. The photodiodes 11a-11p are made by diffusing impurities to make p-type layers on an N-type silicon substrate 10 and are each covered with a mask 12 to change the light receiving area of the photodiodes 11a-11p as shown in detail in FIG. 4. The mask 12 is comb-shaped to uniformly reduce the light receiving area of the photodiodes 11a-11p and covers the photodiodes 11a-11p with different areas according to the position thereof to effect weighting of the light measuring. The mask 12 is made of aluminum and serves also as an electrode and can favorably be connected integrally with a lead wire 13 made of vacuum deposited aluminum. The cross-sectional structure of the light receiving portion is shown in detail in FIG. 5, in which the reference numeral 14 designates a silicon oxide film for insulation.

Figure 6:
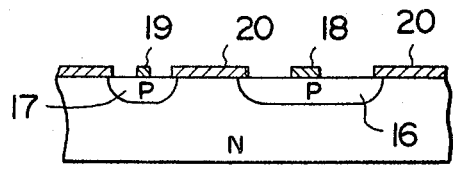
FIG. 6 is a fragmentary sectional view of a light measuring device having photodetectors of different light receiving area as shown in FIG. 2.

FIG. 6 shows another embodiment of the present invention in which the size of the photodetectors themselves depends on the position thereof. In the example shown in FIG. 6, the size of a p-type layer 16 is larger than that of a p-type layer 17, and accordingly is weighted more than the latter. On the p-type layers 16 and 17 are provided electrodes 18 and 19, respectively. The reference numeral 20 indicates a silicon oxide film.

Figure 7:
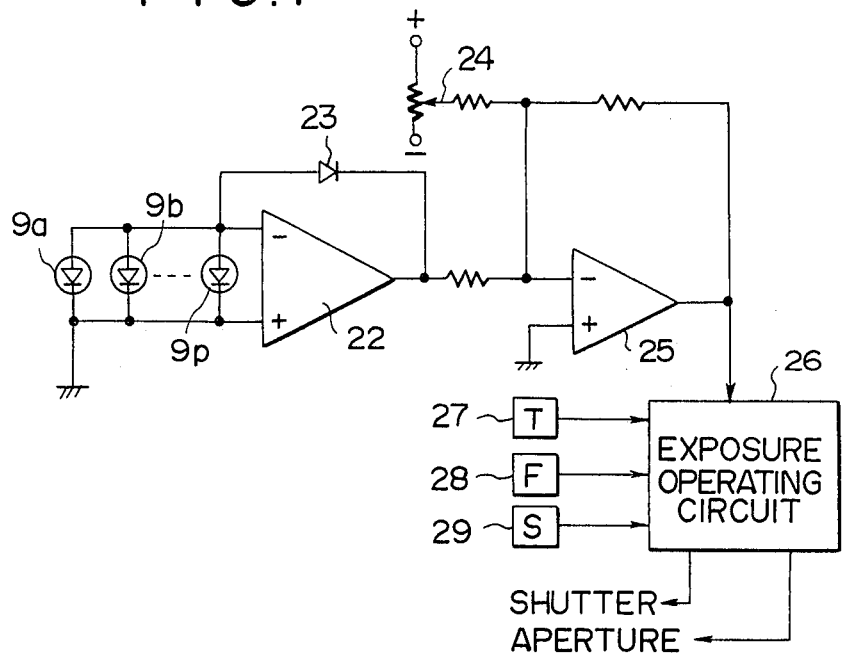
FIG. 7 is a block diagram of an exposure control device employing the light measuring device of the present invention.

FIG. 7 shows an example of an exposure control device employing an optically weighted light measuring device. Photodetectors 9a-9p as employed in the example shown in FIG. 2 are connected in parallel and connected with the input terminals of an operational amplifier 22. The photocurrent of the photodetectors 9a-9p is log-converted by means of a log diode 23 and the operational amplifier 22. The output of the operational amplifier 25 and a predetermined voltage given by a potentiometer 24 are summed by an operational amplifier 25. The output of the operational amplifier 25 is inputted into an exposure operating circuit 26, where it is operated on together with outputs from a film sensitivity information input means 29 and a shutter speed information input means 27 or an aperture information input means 28. The exposure operating circuit 26 outputs an exposure control signal for controlling an aperture and/or a shutter speed.

In case of the electrically weighted light measuring device, the photodiodes are connected to different resistors and weighted according to the position of the photodiodes.

Figure 8:
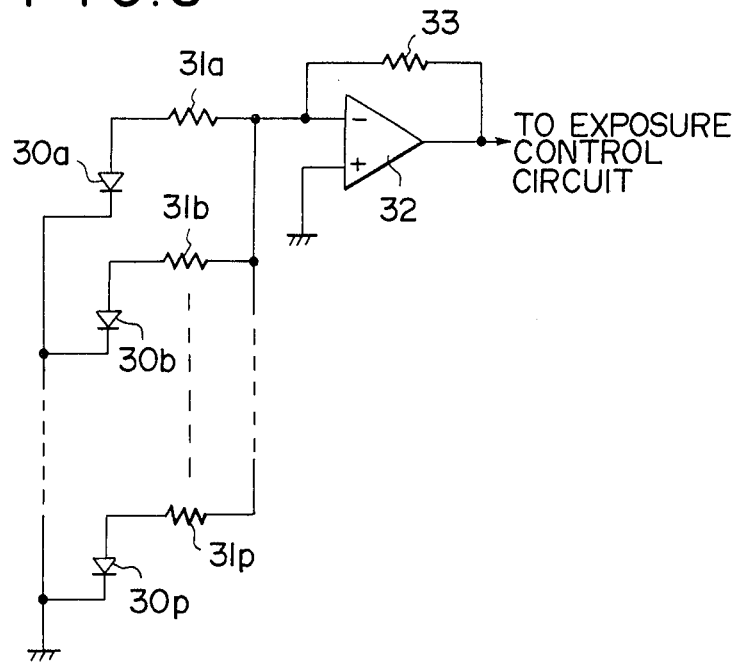
FIG. 8 is a circuit view of an example of an electric circuit for electrically weighting the outputs of the 5 photodetectors.

One example of an electric circuit connected with the light measuring device including photodiodes connected with different resistors will be described referring to FIG. 8. Photodiodes 30a-30p having the same light receiving area are arranged as shown in FIG. 3 and are connected at their anodes with resistors 31a-31p of different resistance values, respectively. Each resistance value is determined according to the position of the photodiodes 31a-31p connected therewith for properly weighting the output thereof. The series circuits of the photodiodes 30a-30p are connected in parallel with each other and are connected to one input terminal of an operational amplifier 32. In the feedback circuit of the operational amplifier 32 is connected a resistor 33. The photocurrents provided by the photodiodes 30a-30p are weighted by the ratio of the resistors 31a-31p connected thereto to the resistor 33 in the feedback circuit and then are summed together. The summed value is sent to an operational amplifier as brightness information.

Thus, in the above described embodiments of the present invention, the light measuring device measures the scene brightness or the brightness of a subject matter in a weighted measuring pattern. In other words, the different part of the scene are weighted in the light or brightness measurement. Further, the way of weighting can be made in any pattern and it is possible to weight the photodetectors in any complex weighting pattern. Therefore, it is possible to provide a complex weighted measuring system which is more practical than the conventional center-weighted light measuring system or the averaged light measuring system.

I claim:

1. A light measuring device for measuring the brightness of a subject matter, comprising a plurality of photodetectors arranged to measure the brightness of different respective parts of the subject matter, weighting means for weighting the output of said photodetectors to different respective degrees according to the position of the photodetectors, and summing means receiving the weighted outputs of said photodetectors to provide an exposure output.

2. A light measuring device as defined in claim 1 wherein said weighting means comprises means to make different the incident luminous flux received by the various photodetectors when viewing a uniformly bright subject matter.

3. A light measuring device as defined in claim 2 wherein said means to make different is an optical means for optically changing the light receiving area of the photodetectors.

4. A light measuring device as defined in claim 3 wherein said optical means is a mask disposed upon the photodetectors for covering said photodetectors with different areas according to the position of the photodetectors.

5. A light measuring device as defined in claim 4 wherein said mask serves as an electrode for the photodiodes.

6. A light measuring device as defined in claim 1 wherein said weighting means comprises resistors of different resistance values each connected with the output of an associated one of the photodiodes.

7. A light measuring device for measuring the brightness of a subject matter comprising a plurality of photodetectors arranged to measure the brightness of different parts of the subject matter, said photodetectors having different respective sizes according to their positions, and summing means receiving the outputs of said photodetectors to provide an exposure output.

8. A light measuring device for measuring the brightness of a subject matter comprising a plurality of photodetectors arranged to measure the brightness of different parts of the subject matter, weighting means for weighting the photodetectors according to the position of the photodetectors, and means for summing up the outputs of the weighted photodetectors.

9. A light measuring device for measuring the brightness of a subject matter as defined in claim 8 wherein said means for summing up includes: and operational amplifier; and means for connecting said photodetectors in parallel with each other; and, means for connecting the resulting parallel circuit of the photodetectors to said operational amplifier.

10. A light measuring device for measuring the brightness of a subject matter comprising a plurality of photodetectors arranged to measure the brightness of different parts of the subject matter, resistors having different resistance connected with said photodetectors in series therewith, and summing up means connected with the series circuits of the resistors and photodetectors for summing up the outputs of all the photodetectors.

11. A light measuring device for measuring the brightness of a subject matter as defined in claim 10 wherein said summing up means comprises an operational amplifier and means for connecting the parallel circuit of said series circuits of the photodetectors and the resistors to one input terminal of the operational amplifier.

* * * * *